(12) United States Patent
Park et al.

(10) Patent No.: US 10,431,921 B2
(45) Date of Patent: Oct. 1, 2019

(54) SEALING COVER AND ACTUATOR HAVING SAME

(71) Applicant: LG INNOTEK CO., LTD., Seoul (KR)

(72) Inventors: Chang Hyun Park, Seoul (KR); Seong Jin Kim, Seoul (KR); Kyung Sang Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 426 days.

(21) Appl. No.: 15/333,570

(22) Filed: Oct. 25, 2016

(65) Prior Publication Data

US 2017/0117653 A1 Apr. 27, 2017

(30) Foreign Application Priority Data

Oct. 26, 2015 (KR) .................. 10-2015-0148856
Jun. 7, 2016 (KR) .................. 10-2016-0070407

(51) Int. Cl.
| | | |
|---|---|---|
| H01R 13/115 | (2006.01) | |
| H02K 5/22 | (2006.01) | |
| H02K 5/10 | (2006.01) | |
| H02K 7/116 | (2006.01) | |
| H02K 3/52 | (2006.01) | |

(52) U.S. Cl.
CPC ............ *H01R 13/115* (2013.01); *H02K 5/10* (2013.01); *H02K 5/225* (2013.01); *H02K 7/1166* (2013.01); *H02K 3/522* (2013.01); *H02K 2203/09* (2013.01)

(58) Field of Classification Search
CPC .......... H02K 3/522; H02K 5/10; H02K 5/225; H02K 7/1166; H02K 2203/09; H01R 13/115

See application file for complete search history.

(56) References Cited

U.S. PATENT DOCUMENTS

| 5,086,243 A | 2/1992 | Hofmann |
| 5,144,738 A | 9/1992 | Oyafuso |
| 5,280,210 A | 1/1994 | Kress et al. |
| 2008/0284265 A1 | 11/2008 | Chaohai et al. |
| 2012/0223604 A1 | 9/2012 | Hennecke et al. |
| 2015/0180299 A1 | 6/2015 | Kuroda et al. |

FOREIGN PATENT DOCUMENTS

| EP | 1677404 A2 | 7/2006 |
| EP | 2849315 A2 | 3/2015 |
| GB | 2221102 A | 1/1990 |
| JP | 7-322556 A | 12/1995 |
| JP | 2012-186919 A | 9/2012 |
| WO | WO 2005/077017 A2 | 8/2005 |

*Primary Examiner* — Ramon M Barrera
(74) *Attorney, Agent, or Firm* — Birch, Stewart, Kolasch & Birch, LLP

(57) ABSTRACT

Disclosed herein is a sealing cover. The sealing cover includes a cap, a grommet configured to extend from the cap, and a terminal inserted into the grommet, wherein the grommet includes a groove formed to be recessed and having the terminal inserted therein. Advantageous effects are provided such that a process for assembly is simplified and flexibility of terminals is secured.

14 Claims, 14 Drawing Sheets

SEALING COVER AND ACTUATOR HAVING SAME

CROSS-REFERENCE TO RELATED APPLICATION

This application claims priority to and the benefit of Korean Patent Application No. 2015-0148856, filed on Oct. 26, 2015 and of Korean Patent Application No. 2016-0070407, filed on Jun. 7, 2016 the disclosure of which is incorporated herein by reference in its entirety.

BACKGROUND

1. Field of the Invention

The present invention relates to a sealing cover and an actuator having the same.

2. Discussion of Related Art

When a motor is connected to a vehicle part such as a brake apparatus, a brake oil and a lubricating oil used in the brake apparatus can flow into the motor. To prevent such a flow, a sealing cover may be provided at an end cover of the motor.

However, a structure of such a sealing cover has a problem in that a structure for assembly is complex. Particularly, there is a problem in that positions of terminals become complex due to the sealing cover.

SUMMARY OF THE INVENTION

The present invention is directed to a sealing cover having a simple structure for assembly and an actuator including the same.

The scope of the present invention is not limited to the above-described objects, and other unmentioned objects may be clearly understood by those skilled in the art from the following descriptions According to an aspect of the present invention, there is provided a sealing cover including a cap, a grommet configured to extend from the cap, and a terminal inserted into the grommet.

The terminal may include a first connecting end disposed at one side of the terminal and a second connecting end disposed at the other side with the cap interposed therebetween.

The terminal may include a body disposed along a circumference of the cap and configured to connect the first connecting end and the second connecting end.

The grommet may include a terminal connecting hole formed at a position of the first connecting end.

The grommet may include coupling flanges respectively formed at positions of the first connecting end and the second connecting end.

According to another aspect of the present invention, there is provided an actuator including a housing, a motor disposed in the housing, and a sealing cover including a cap configured to cover the housing, a grommet configured to extend from the cap, and a terminal inserted into the grommet and electrically connected to the motor.

The motor may include a motor and a screw connected to the motor, and the housing may include a motor accommodation portion configured to accommodate the motor and a screw accommodation portion configured to communicate with the motor accommodation portion and accommodate the screw.

The screw accommodation portion may include an inlet connected to the motor accommodation portion and an outlet open to an outside, and the cap may be coupled to the outlet.

The motor may include a stator disposed inside the motor accommodation portion and having a coil wound therearound, a rotor disposed at an inner side of the stator, a shaft coupled to the rotor, and a busbar connected to the coil.

The terminal may include a first connecting end disposed at one side of the terminal and a second connecting end disposed at the other side with the cap interposed therebetween.

The motor may include a connecting terminal configured to connect the first connecting end and the busbar.

The terminal may include a body disposed along a circumference of the cap and configured to connect the first connecting end and the second connecting end.

The grommet may include a terminal connecting hole formed at a position of the first connecting end.

The housing may include a connecting terminal accommodation portion configured to accommodate the connecting terminal.

The motor part may include a worm wheel engaged with the screw.

The housing may include a worm wheel accommodation portion configured to communicate with the screw accommodation portion.

The terminal may include a first connecting end disposed at one side of the terminal and a second connecting end disposed at the other side with the cap interposed therebetween, the motor includes a connecting terminal configured to connect the first connecting end and the bulbar, the housing includes a connecting terminal accommodation portion configured to accommodate the connecting terminal, and the worm wheel accommodation portion is disposed at one side and the connecting terminal accommodation portion is disposed at the other side with respect to the screw accommodation portion.

The second connecting end may be disposed above the worm wheel accommodation portion.

The grommet may include a groove formed to be recessed such that the terminal is inserted thereinto.

According to still another aspect of the present invention, there is provided a sealing cover including a cap, a grommet configured to extend from the cap, and a terminal inserted into the grommet, wherein the grommet includes a groove formed to be recessed such that the terminal is inserted thereinto.

The groove may be formed to be recessed in a top surface of the grommet.

The groove may connect one side and the other side of the groove with the cap interposed therebetween.

The groove may be disposed along a circumference of the cap.

The grommet may include an accommodation portion formed to be recessed, connected to the groove, and configured to accommodate an external connector connected to a connecting end of the terminal.

The grommet may include a fixing portion configured to protrude adjacent to the groove and fix the terminal inserted into the groove.

The fixing portion may include a column configured to protrude from a top surface of the grommet and a hook formed at an end of the column and configured to restrict the terminal inserted into the groove.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an exemplary embodiment of the present invention will be described with reference to the accompanying drawings in detail. Purposes, specific advantages, and novel features of the invention will be made clear from exemplary embodiments and the following detailed description in connection with the accompanying drawings. Terms and words used in this specification and claims are not to be interpreted as limited to commonly used meanings or meanings in dictionaries, and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

Figure 1:
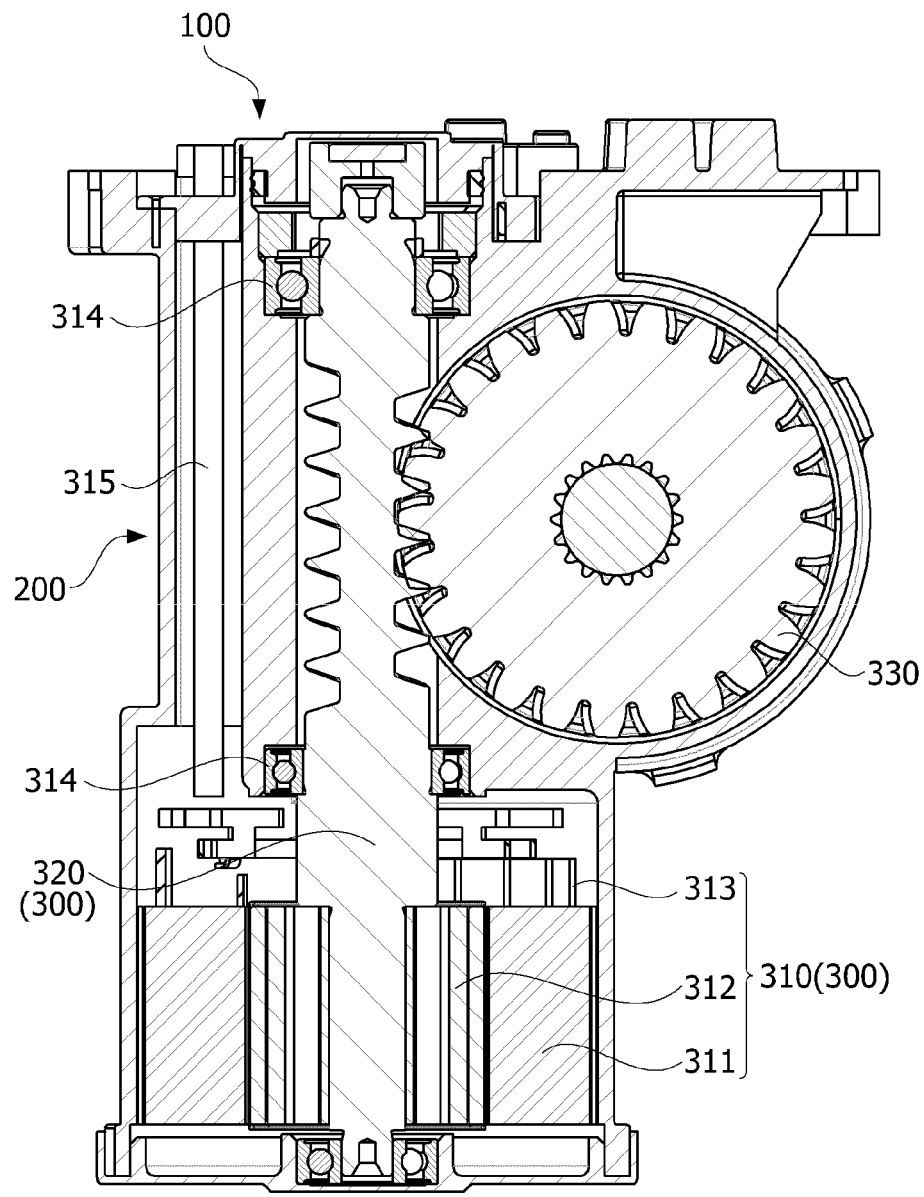
FIG. 1 is a view illustrating an actuator according to an embodiment.
Figure 2:
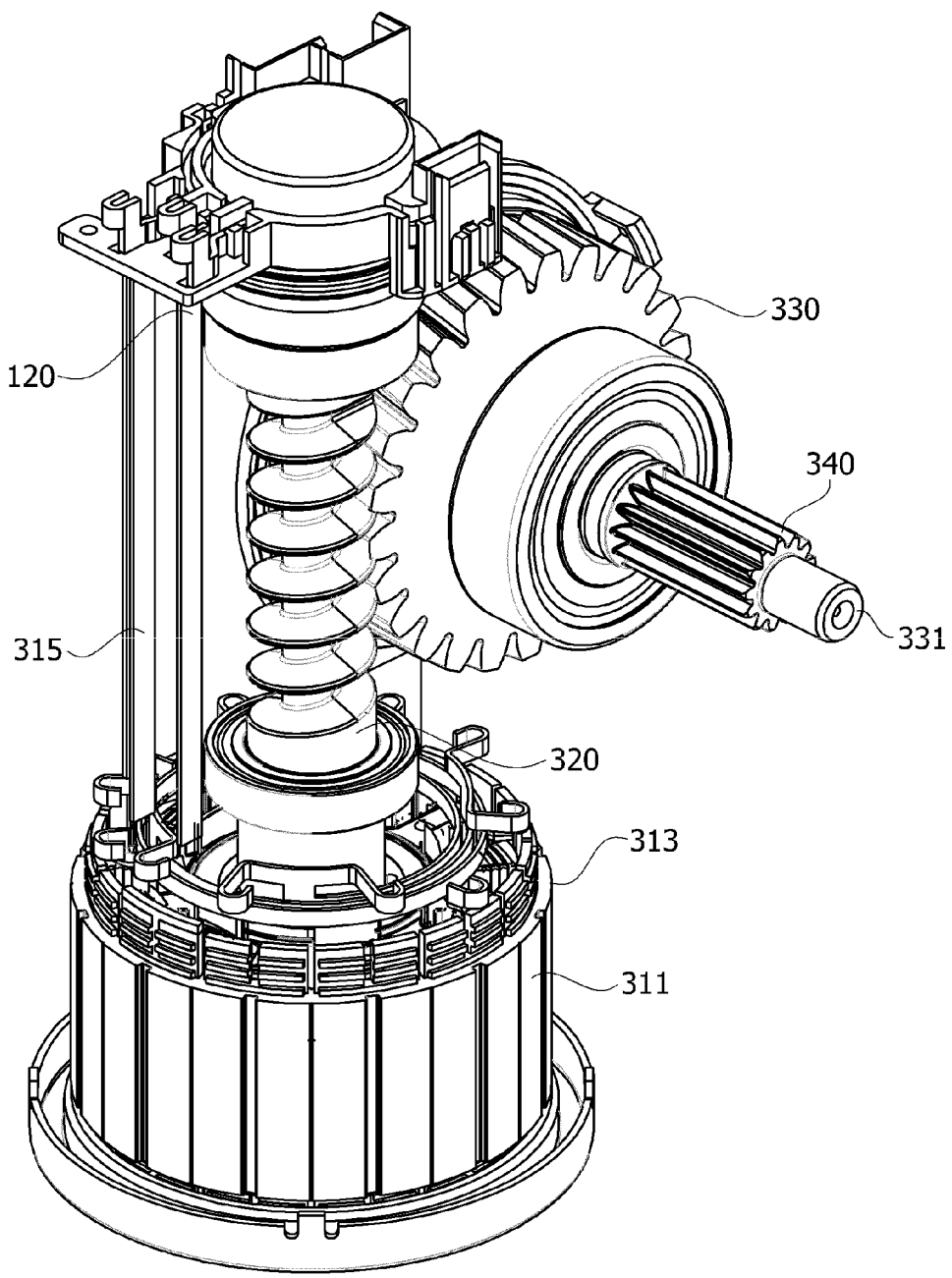
FIG. 2 is a view illustrating a motor shown in FIG. 1.

FIG. 1 is a view illustrating an actuator according to an embodiment, and FIG. 2 is a view illustrating a motor shown in FIG. 1. FIGS. 1 and 2 are views clearly illustrating only main features for a clear conceptual understanding of the present invention, and the scope of the present invention is not limited to specific shapes illustrated in the drawings, and as a result, various modifications should be expected.

Referring to FIGS. 1 and 2, the actuator according to the embodiment may include a sealing cover 100, a housing 200, and a motor 300. The sealing cover 100 may be coupled to an upper portion of the housing 200, and the motor 300 may be installed in the housing 200.

The motor 300 may include a motor 310 and a screw 320.

The motor 310 may include a stator 311, a rotor 312, and busbars 313.

The stator 311 is coupled to the housing 200, and the rotor 312 is disposed at an inner side of the stator 311. The screw 320 may be coupled to a central portion of the rotor 312. Coils are wound around the stator 311 to have magnetic poles, and thus the rotor 312 is rotated due to a magnetic field generated by the wound coils and the screw 320 is rotated simultaneously therewith.

The stator 311 may be formed to include a plurality of stator cores. For example, each of the stator cores may be formed by stacking a plurality of steel plates including a ring-shaped yoke and teeth disposed in a circumferential direction, protruding from the yoke in an inward direction of a diameter thereof, and having equal angular gaps. The coils may be wound around the teeth. Here, the coils may be insulated from each other by an insulator.

The rotor 312 is disposed at the inner side of the stator 311. The rotor 312 may be formed by coupling a magnet to a rotor core, and the rotor core may also be integrally formed with the magnet in some cases. In addition, the rotor 312 may be formed as a type in which the magnet is coupled to a circumferential surface of the rotor core or as a type in which the magnet is inserted into a pocket of the rotor core.

The busbars 313 may be provided on the stator 311. The busbars 313 are for connecting the coils disposed in parallel and are electrically connected to the coils. The busbars 313 are provided with ring-shaped bodies formed of insulating materials, and the ring-shaped bodies are provided with terminals to be connected to the coils. In addition, the busbars 313 may be connected to terminals and may supply electricity to the coils through power terminals which receive external power having polarities different from each other.

The screw 320 is coupled to the rotor 312. The screw 320 rotates in conjunction with rotation of the rotor 312. Here, the screw 320 may be a worm gear.

A worm wheel 330 may be disposed to engage with the screw 320. The worm wheel 330 may rotate about a wheel shaft 331 in conjunction with rotation of the screw 320. A pinion gear 340 may be formed on the wheel shaft 331. The pinion gear 340 rotates when the worm wheel 330 rotates, and thus a driving force necessary for a vehicle may be supplied by the rotation of the pinion gear 340. Here, the driving force necessary for a vehicle may be a force for braking, and the pinion gear 340 may be connected to a brake apparatus of a vehicle such that power is transmitted thereto.

Figure 3:
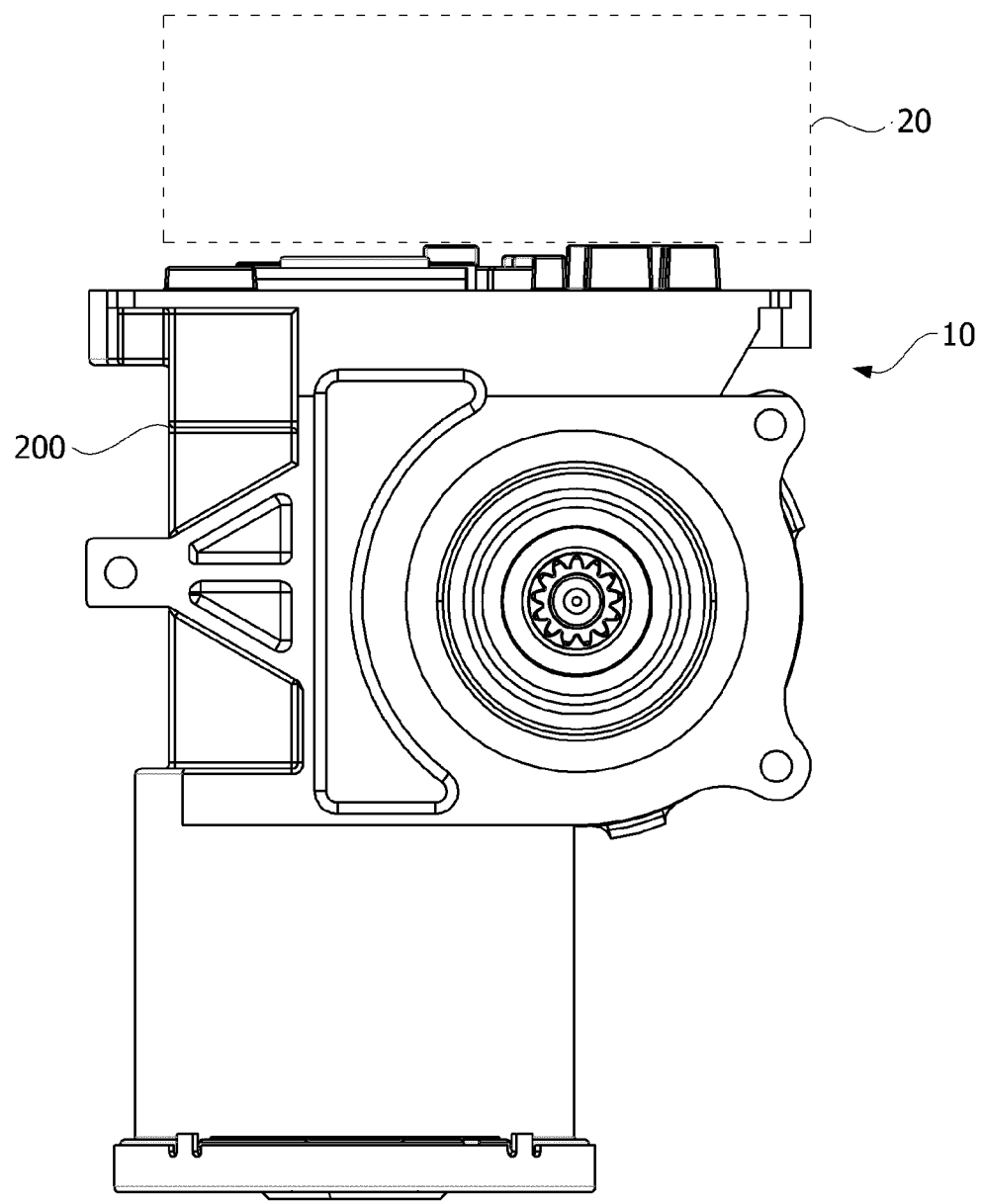
FIG. 3 is a view illustrating a position of a vehicle part to which the actuator shown in FIG. 1 is coupled.

FIG. 3 is a view illustrating a position of a vehicle part to which the actuator shown in FIG. 1 is coupled.

Referring to FIG. 3, a vehicle part 20, such as a brake apparatus, may be coupled to a top of an actuator 10.

Figure 4:
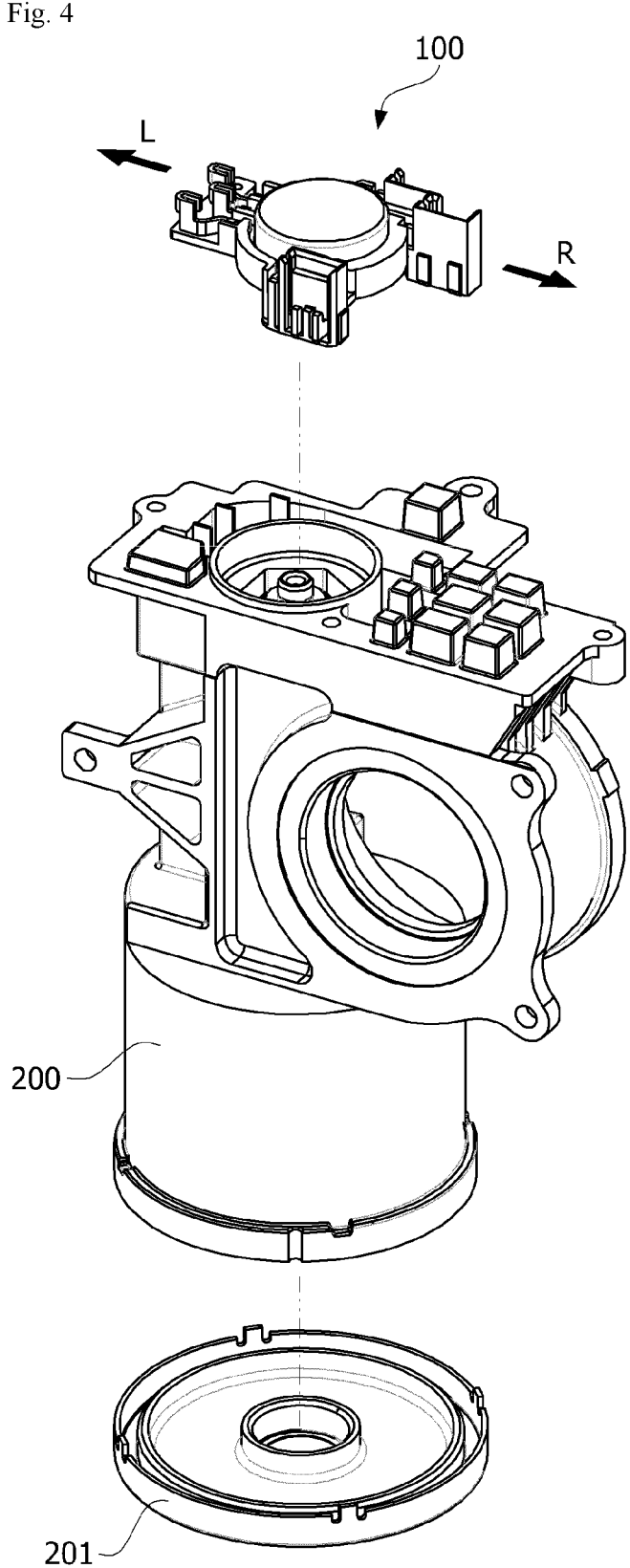
FIG. 4 is a view illustrating a housing and a sealing cover which covers the housing.
Figure 5:
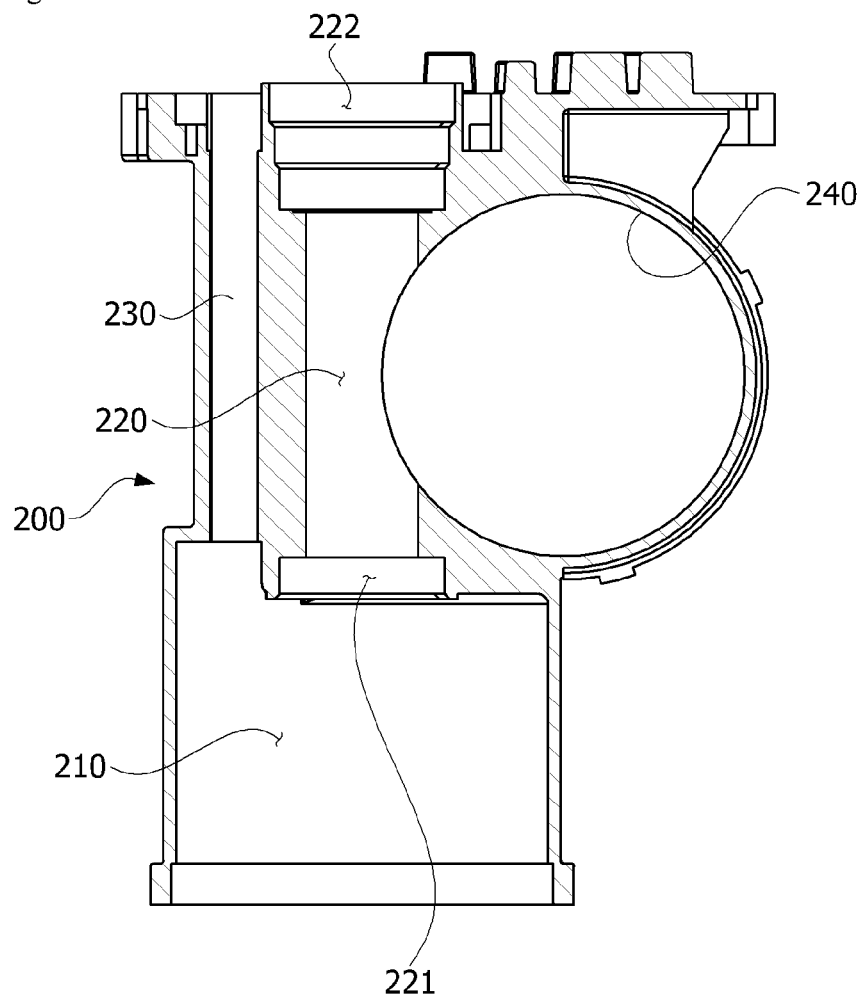
FIG. 5 is a view illustrating an inside of the housing.

FIG. 4 is a view illustrating a housing and a sealing cover which covers the housing, and FIG. 5 is a view illustrating an inside of the housing.

Referring to FIGS. 2 to 5, the housing 200 may be partitioned to include a motor accommodation portion 210, a screw accommodation portion 220, a connecting terminal accommodation portion 230, and a worm wheel accommodation portion 240.

The motor accommodation portion 210 is formed in a lower portion of the housing 200 and has an internal space in which the motor 310 is accommodated.

The screw accommodation portion 220 is disposed above the motor accommodation portion 210 and communicates with the motor accommodation portion 210. The screw accommodation portion 220 provides a space which is formed to be vertically long with the screw 320 inserted thereinto. An inlet 221 of the screw accommodation portion 220 may be connected to the motor accommodation portion 210, and an outlet 222 thereof may be connected to a vehicle part such as a brake apparatus.

The connecting terminal accommodation portion 230 is formed to be vertically long and has an accommodation space in which connectors 315 shown in FIG. 2 are positioned. A lower portion of the connecting terminal accommodation portion 230 may be connected to the motor accommodation portion 210, and an upper portion thereof may be formed in an open shape.

The lower portion of the housing 200 may be open. A cover 201 is coupled to the open lower portion of the housing 200. The motor accommodation portion 210 is sealed with the cover 201.

The worm wheel accommodation portion 240 communicates with the screw accommodation portion 220 and has an accommodation space for the worm wheel 330.

The worm wheel 330 may be disposed at one side with respect to the screw accommodation portion 220, and the connecting terminal accommodation portion 230 may be disposed at the other side. For example, the worm wheel 330 may be disposed in front of the screw accommodation portion 220, and the connecting terminal accommodation portion 230 may be disposed behind the screw accommodation portion 220.

Meanwhile, a brake oil or lubricating oil of a brake apparatus may flow into the screw accommodation portion 220 through the outlet 222 of the screw accommodation portion 220. Accordingly, it is necessary for the sealing cover 100 to seal the outlet 222 of the screw accommodation portion 220.

Figure 6:
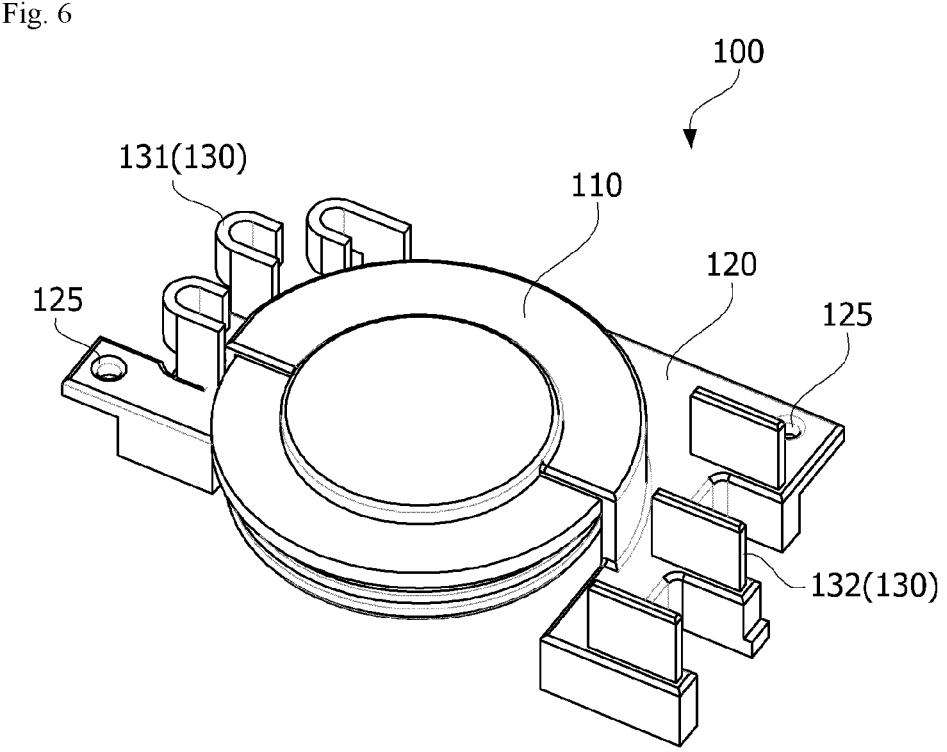
FIG. 6 is a view illustrating a sealing cover according to a first modified embodiment.
Figure 7:
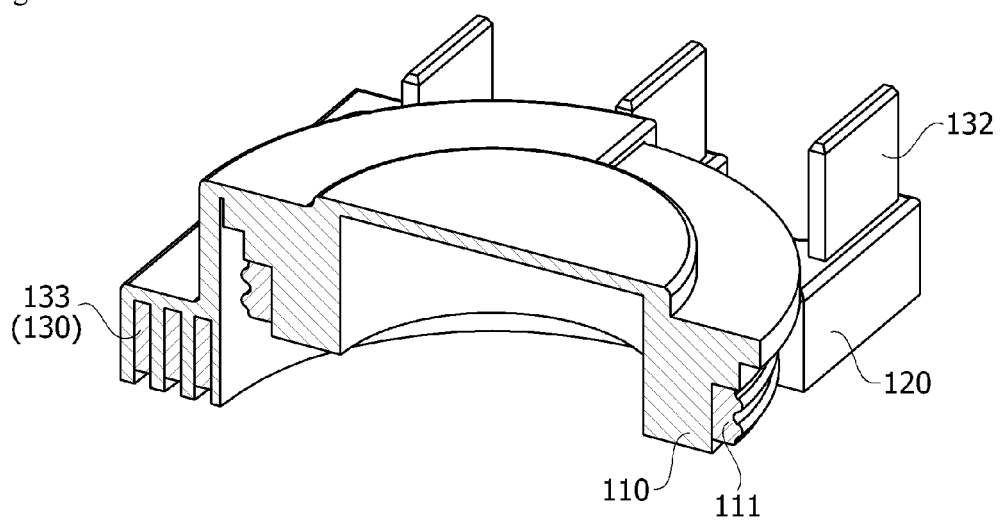
FIG. 7 is a cross-sectional view illustrating the sealing cover shown in FIG. 6.
Figure 8:
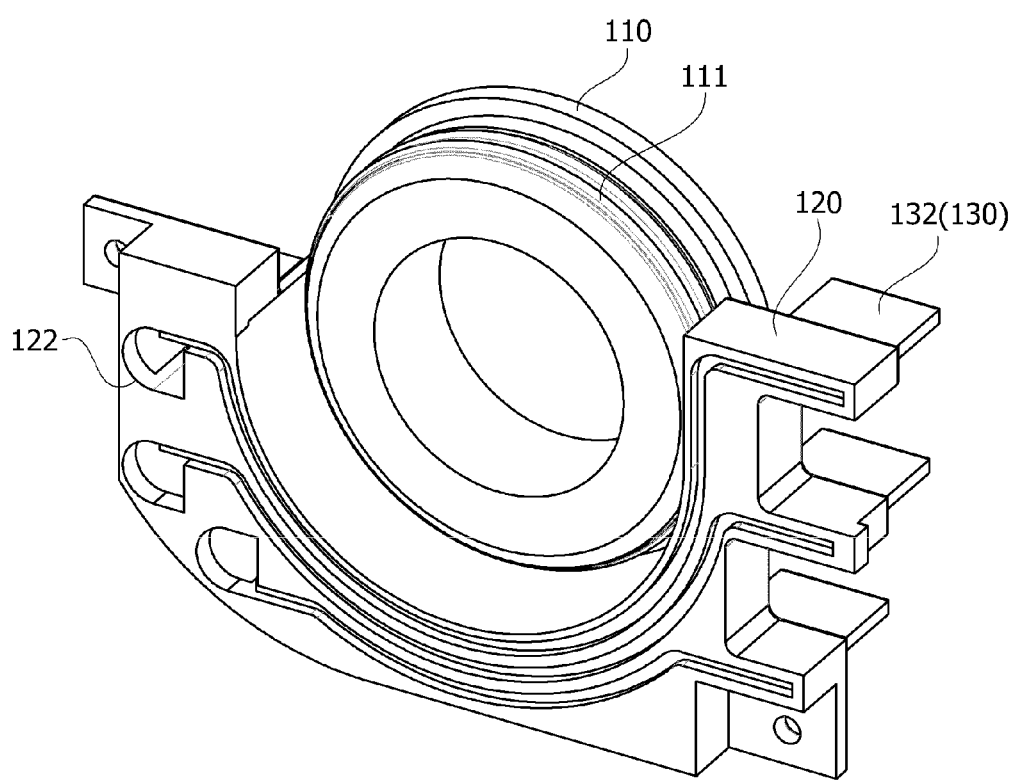
FIG. 8 is a bottom view illustrating the sealing cover shown in FIG. 6.

FIG. 6 is a view illustrating a sealing cover according to a first modified embodiment, FIG. 7 is a cross-sectional view illustrating the sealing cover shown in FIG. 6, and FIG. 8 is a bottom view illustrating the sealing cover shown in FIG. 6. Here, FIG. 6 is a view clearly illustrating only main features for a clear conceptual understanding of the present invention and the scope of the present invention is not limited to specific shapes illustrated in the drawing, and as a result various modifications should be expected.

Referring to FIGS. 6 to 8, the sealing cover 100 may include a cap 110, a grommet 120, and terminals 130. The cap 110, the grommet 120, and the terminals 130 may be one part formed by injection molding.

The cap 110 is a member which seals the screw accommodation portion 220 by covering the outlet 222 of the screw accommodation portion 220 and may be inserted into the outlet 222. The cap 110 may be formed as a cylindrical member to correspond to a shape of the outlet 222 and may be formed of an elastic material to increase adhesion. In addition, a sealing member 111 may be additionally installed along a circumference of the cap 110 to increase adhesion.

The grommet 120 may extend from the cap 110 and be integrally formed with the cap 110. In consideration of shapes and positions of the terminals 130, the grommet 120 may be formed to extend in one direction with respect to the cap 110 and to extend to the other direction. Because the cap 110 and the grommet 120 are integrated and installed in a housing 200 as a single part, there is an advantage in that an assembly process which implements sealing of the housing 200 and an electrically connected structure is simplified.

Meanwhile, coupling flanges 125 may be respectively formed at both side surfaces of the grommet 120 at which first connecting ends 131 and second connecting ends 132 are positioned. The coupling flanges 125 are places into which coupling members, such as a screw, are inserted to be coupled to the housing 200.

The terminals 130 are connected to busbars 313 of a motor 310. The terminals 130 may be inserted into the grommet 120. In addition, the terminals 130 may include the first connecting ends 131, the second connecting ends 132, and bodies 133.

The first connecting ends 131 and the second connecting ends 132 may be disposed with the cap 110 interposed therebetween. For example, the first connecting ends 131 may be disposed behind the cap 110, and the second connecting ends 132 may be disposed in front of the cap 110. Here, connectors 315 in FIG. 2 are connected to the first connecting ends 131, and an external power source is connected to the second connecting ends 132.

The bodies 133 are disposed along a circumference of the cap 110 and serve a function of connecting the first connecting ends 131 and the second connecting ends 132. The bodies 133 may be formed to have a curved surface and to be positioned along the circumference of the cap 110 having a cylindrical shape.

As illustrated in FIG. 8, terminal connecting holes 122 formed at positions of the first connecting ends 131 of the terminals 130 may be formed in the grommet 120. The connectors 315 in FIG. 2 extending from the busbars 313 pass through the terminal connecting holes 122 and are connected to the first connecting ends 131.

Figure 9:
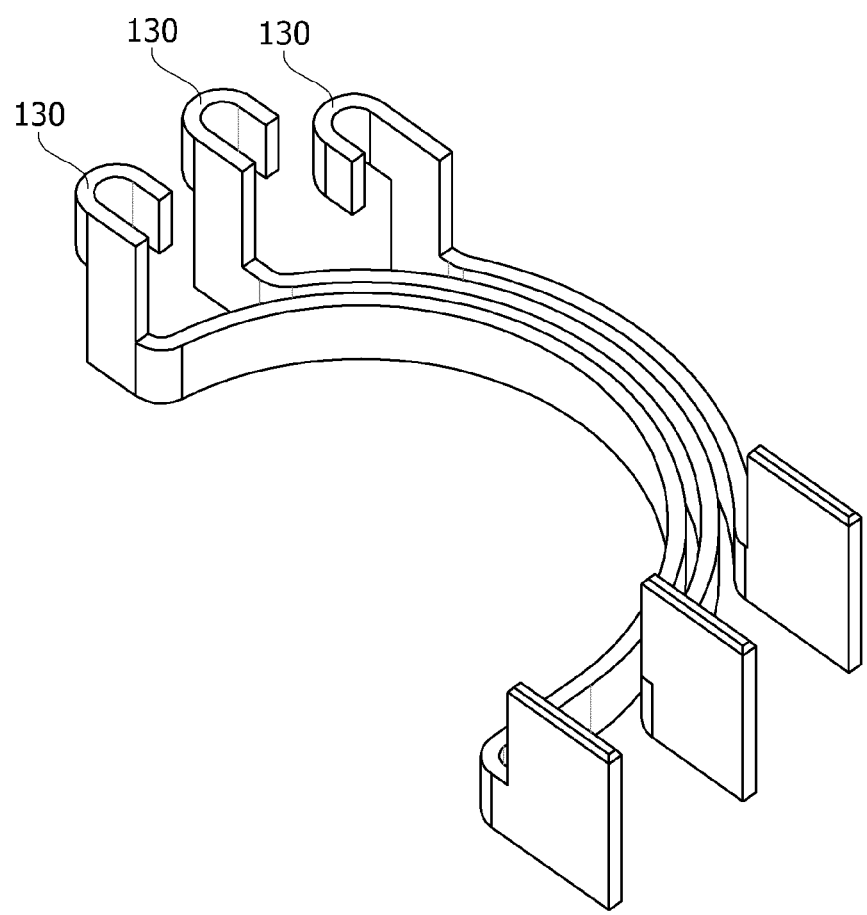
FIG. 9 is a view illustrating terminals.
Figure 10:
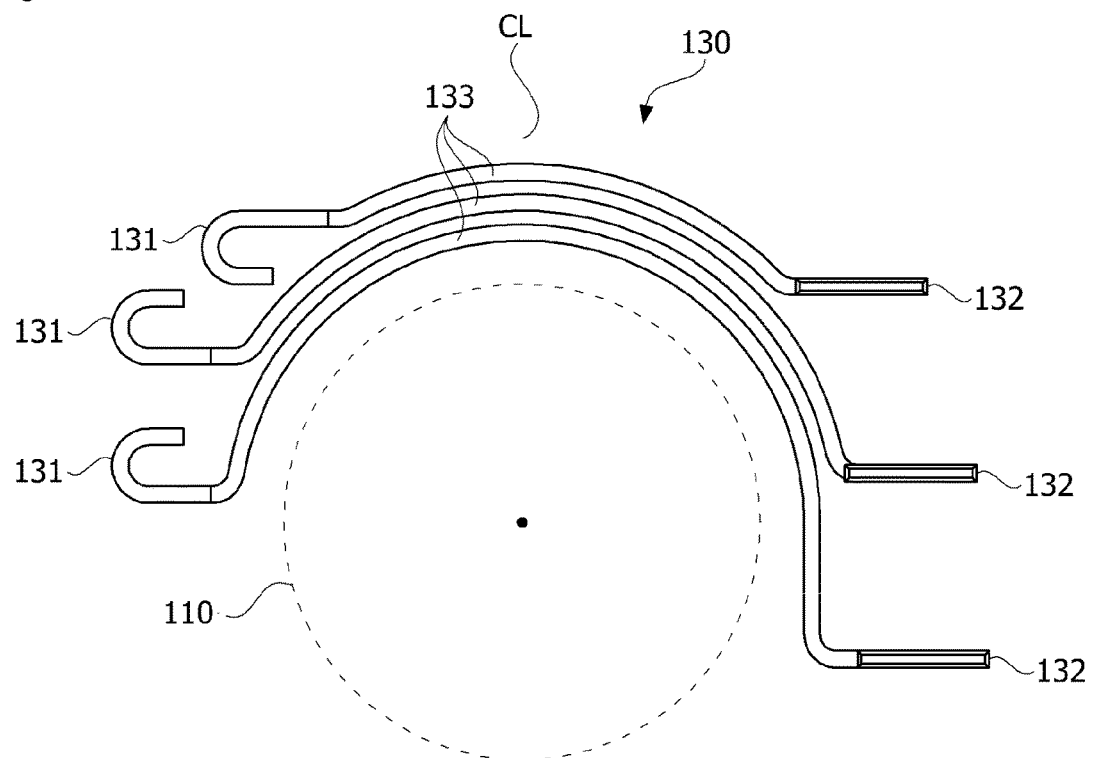
FIG. 10 is a view illustrating positions of first connecting ends and second connecting ends of the terminals.

FIG. 9 is a view illustrating terminals, and FIG. 10 is a view illustrating positions of first connecting ends and second connecting ends of the terminals;

Referring to FIGS. 9 and 10, three terminals 130 configured to be respectively connected to an U, V, and W-phase power source may be provided. Each of the terminals 130 may be disposed in a shape in which the bodies 133 are arranged in a radial direction of the cap 110. As a result, the first connecting ends 131 are disposed at a left side on the drawing and the second connecting ends 132 are disposed at a right side on the drawing, with respect to a virtual vertical base line CL passing through the center of the cap 110.

Because positions of the first connecting ends 131 connected to the connectors 315 and positions of the second connecting ends 132 connected to an external power source are positioned to be maximally distant from each other, there are advantages in that a structure for assembly is simplified and structural stability is high. A structure in which the positions of the second connecting ends 132 connected to the external power source are positioned opposite the first connecting ends 131 in consideration of the connectors 315 that are formed to have long lengths greatly facilitates assemblability.

Figure 11:
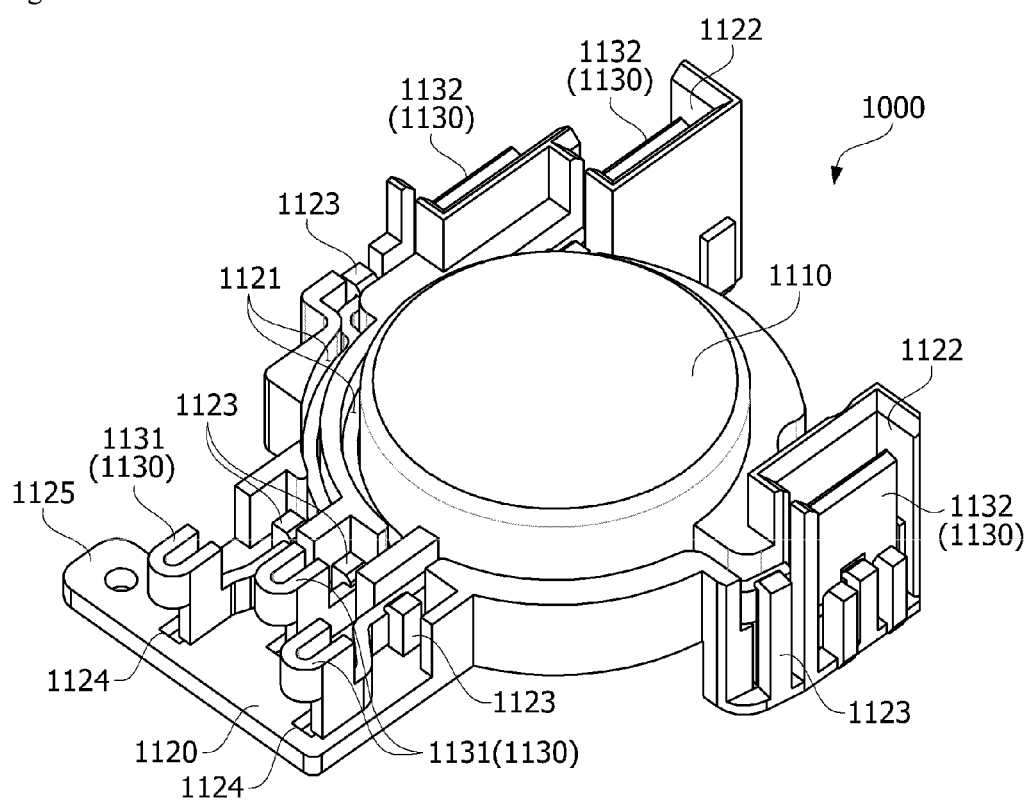
FIG. 11 is a view illustrating a sealing cover according to a second modified embodiment.

FIG. 11 is a view illustrating a sealing cover according to a second modified embodiment.

Referring to FIG. 11, a grommet 1120 of a sealing cover 1000 according to the second modified embodiment may include grooves 1121.

The grooves 1121 are grooves into which terminals 1130 are inserted. The grooves 1121 are formed to be recessed in a top surface of the grommet 1120 and have spaces into which the terminals 1130 are inserted. The sealing cover 1000 is formed so that the terminals 1130 are inserted into the grommet 1120 after a cap 1110 is mounted on the sealing cover 1000. This simplifies a manufacturing process and secures flexibility of the terminals 1130. To this end, the terminals 1130 are not included in the sealing cover 1000 according to the embodiment, but are implemented to be inserted into the sealing cover 1000 from an outside thereof through the grooves 1121.

Each of the grooves 1121 is formed to connect one side and the other side of the groove 1121 which interpose the cap 1110. This is in consideration of shapes and positions of each of the terminals 1130. In addition, the grooves 1121 may be formed along a circumference of the cap 1110. Cross-sectional shapes of the grooves 1121 may be formed to correspond to those of the terminals 1130. For example, the grooves 1121 may be formed to have rectangular cross-sections in consideration of cross-sections of the terminals 1130 having a shape of a thin plate. The grooves 1121 may be formed to be deeper than heights of the terminals 1130 such that the terminals 1130 inserted into the grooves 1121 are not exposed to an outside of the grommet 1120.

The number of grooves 1121 may correspond to the number of terminals 1130. Total three grooves 1121 may be provided to correspond to three terminals 1130 connected to an U, V, and W-phase power source.

Accommodation portions 1122 connected to the grooves 1121 may be respectively provided at end portions of the grooves 1121. The accommodation portions 1122 are formed to be recessed in the grommet 1120 and provide spaces in which external connectors connected to the terminals 1130 are accommodated.

Fixing portions 1123 are provided at the grommet 1120 and serve a function of fixing the terminals 1130 such that the terminals 1130 inserted into the grooves 1121 do not escape from the grommet 1120. The fixing portions 1123 may be disposed adjacent to the grooves 1121 along paths of the grooves 1121. For example, some of the fixing portions 1123 may be disposed at end portions of one sides of the grooves 1121 with respect to the cap 1110. In addition, the other fixing portions 1123 may be positioned at end portions of the other sides of the grooves 1121 with respect to the cap 1110.

As a result, the fixing portions 1123 disposed at the both sides with respect to the cap 1110 respectively fix both end portions of the terminals 1130 inserted into the grooves 1121 and stably fix the grommet 1120 to the terminals 1130.

Figure 12:
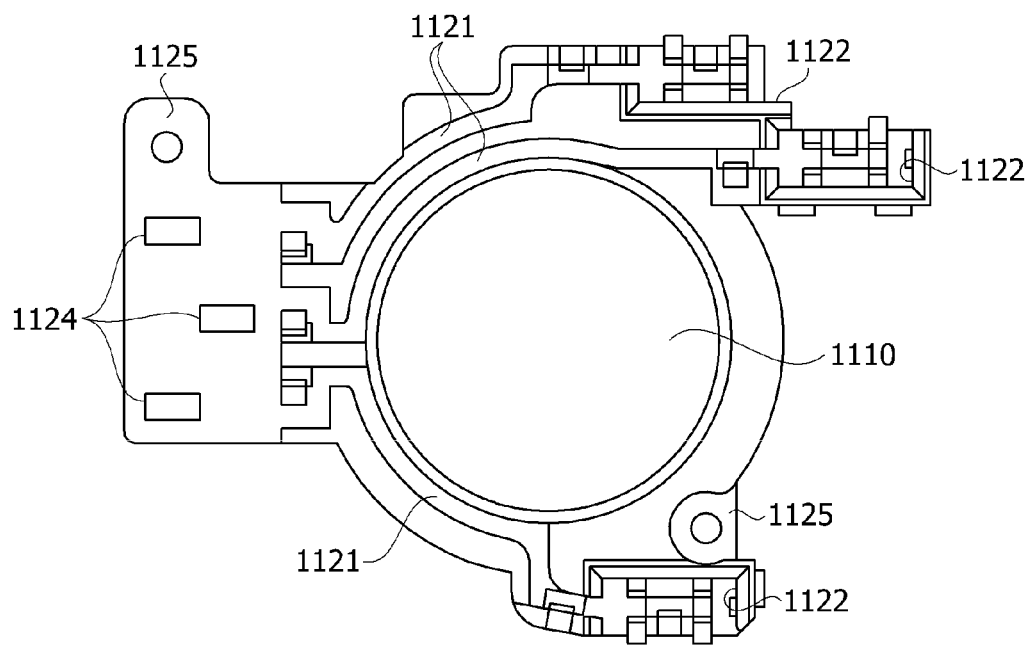
FIG. 12 is a plan view illustrating the sealing cover shown in FIG. 11.
Figure 13:
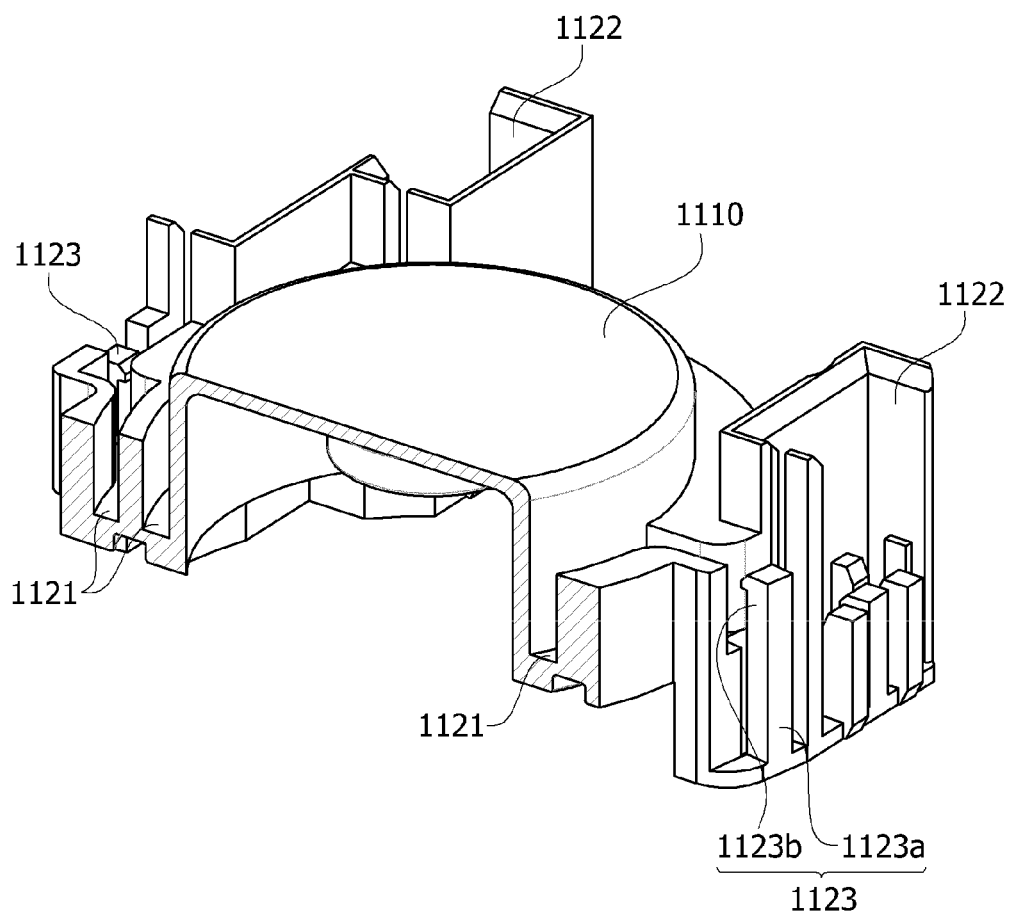
FIG. 13 is a cross-sectional view illustrating the sealing cover shown in FIG. 11.

FIG. 12 is a plan view illustrating the sealing cover shown in FIG. 11, and FIG. 13 is a cross-sectional view illustrating the sealing cover shown in FIG. 11.

Referring to FIGS. 12 and 13, the fixing portions 1123 may include columns 1123a and hooks 1123b. The columns 1123a protrude from the top surface of the grommet 1120. The hooks 1123b may be formed at ends of the columns 1123a. The hooks 1123b are disposed above the grooves 1121 and prevent the terminals 1130 inserted into the grooves 1121 from escaping the grooves 1121. Top surfaces of the hooks 1123b are formed to have inclined surfaces such that the terminals 1130 slide on the hooks 1123b and are easily inserted into the grooves 1121.

As illustrated in FIG. 12, the grommet 1120 may include terminal connecting holes 1124. The terminal connecting holes 1124 are formed to pass through the top surface and a bottom surface of the grommet 1120. The terminal connecting holes 1124 may be formed at one side of the cap 1110. For example, the terminal connecting holes 1124 may be connected to ends of the grooves 1121. In addition, positions of the terminal connecting holes 1124 correspond to positions of connecting ends of the terminals 1130. The connectors 315 in FIG. 2 which extend from the busbars 313 pass through the terminal connecting holes 1124 and are connected to the connecting ends of the terminals 1130.

The number of terminal connecting holes 1124 corresponds to the number of terminals 1130.

Coupling flanges 1125 may be respectively formed at both side surfaces of the grommet 1120. The coupling flanges 1125 are places into which a coupling member, such as a screw, is inserted to be coupled with a housing 200.

The terminals 1130 connect the busbars 313 of the motor 310 and an external power source. The terminals 1130 may be inserted into the grooves 1121 of the grommet 1120.

Figure 14:
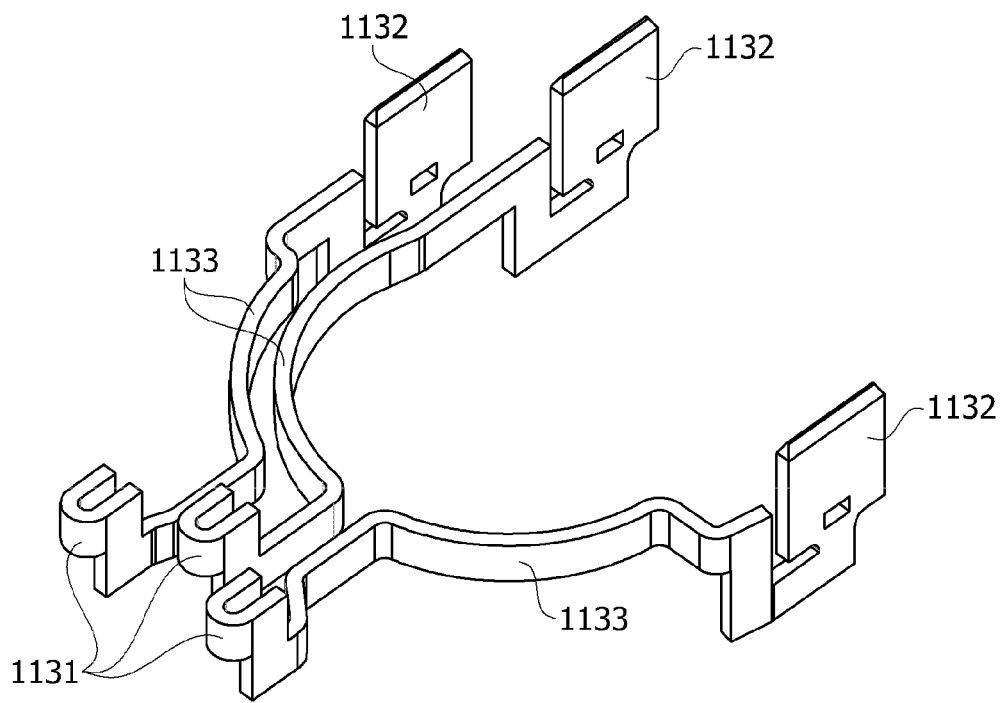
FIG. 14 is a view illustrating terminals.

FIG. 14 is a view illustrating terminals.

Referring to FIG. 14, the terminals 1130 may include first connecting ends 1131, second connecting ends 1132, and bodies 1133. The first connecting ends 1131 and the second connecting ends 1132 may be disposed with the cap 1110 interposed therebetween. For example, the first connecting ends 1131 may be disposed behind the cap 1110, and the second connecting ends 1132 may be disposed in front of the cap 1110. Here, the first connecting ends 1131 are portions to which the connectors 315 are connected, and the second connecting ends 1132 are portions to which an external power source is connected.

The bodies 1133 are disposed along the circumference of the cap 1110 and serve a function of connecting the first connecting ends 1131 and the second connecting ends 1132. The bodies 1133 may be formed to have a curved surface and to be positioned along the circumference of the cap 1110 having a cylindrical shape.

The three terminals 1130 configured to be connected to the U, V, and W-phase power source may be provided. Each of the terminals may be disposed in a shape in which the bodies 1133 are arranged in a radial direction of the cap 1110. As a result, the first connecting ends 1131 are disposed at a left side on the drawing and the second connecting ends 1132 are disposed at a right side on the drawing.

Because positions of the first connecting ends 1131 connected to the connectors 315 and positions of the second connecting ends 1132 connected to the external power source are positioned to be maximum distant from each other, there are advantages in that a structure for assembly is simplified and structural stability is high.

A structure in which the positions of the second connecting ends 1132 connected to the external power source are positioned opposite the first connecting ends 1131 in consideration of the connectors 315 formed to have a long length and connected to the first connecting ends 1131 increases assemblability and secures structural stability.

Shapes of the above-described terminals 1130 correspond to shapes of the grooves 1121.

The sealing cover and the actuator including the same according to one exemplary embodiment of the present invention have been specifically described above with reference to the accompanying drawings.

As described above, according to the embodiment, an advantageous effect in that a structure for assembly of an actuator is simplified by providing a sealing cover in which a cap and a grommet are integrated is provided.

According to the embodiment, an advantageous effect is provided in that a terminal is easily assembled with other parts of a vehicle by disposing a first connecting end of the terminal at one side with respect to a cap and disposing a second connecting end of the terminal at the other side with respect to the cap.

According to the embodiment, advantageous effects are provided in that an assembly process is simplified and flexibility of terminals is secured by inserting the terminal into a grommet after mounting a cap on a housing.

While the present invention has been particularly described with reference to exemplary embodiments, those of skilled in the art should understand that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

REFERENCE NUMERALS 100, 1000: SEALING COVER
110, 1110: CAP
120, 1120: GROMMET
1121: GROOVE
122, 1122: ACCOMMODATION PORTION
123, 1123: FIXING PORTION
124, 1124: TERMINAL CONNECTING HOLE
125, 1125: COUPLING FLANGE
130, 1130: TERMINAL
200: HOUSING
210: MOTOR ACCOMMODATION PORTION
220: SCREW ACCOMMODATION PORTION
221: INLET
222: OUTLET
230: CONNECTING TERMINAL ACCOMMODATION PORTION
240: WORM WHEEL ACCOMMODATION PORTION
300: MOTOR
310: MOTOR
311: STATOR
312: ROTOR
313: BUSBAR
320: SCREW
330: WORM WHEEL
331: WHEEL SHAFT
340: PINION GEAR

What is claimed is:

1. A sealing cover comprising:
a cap;
a grommet configured to extend from the cap; and
a terminal inserted into the grommet,
wherein the terminal includes a first connecting end disposed at one side of the terminal and a second connecting end disposed at the other side of the terminal with the cap interposed therebetween, and
wherein the grommet includes coupling flanges respectively formed at positions of the first connecting end and the second connecting end.

2. The sealing cover of claim 1, wherein the terminal includes a body disposed along a circumference of the cap and configured to connect the first connecting end and the second connecting end.

3. The sealing cover of claim 2, wherein the grommet includes a terminal connecting hole formed at a position of the first connecting end.

4. An actuator comprising:
a housing;
a motor disposed in the housing; and
a sealing cover including a cap configured to cover the housing, a grommet configured to extend from the cap, and a terminal inserted into the grommet and electrically connected to the motor,
wherein the terminal includes a first connecting end disposed at one side of the terminal and a second connecting end disposed at the other side with the cap interposed therebetween, and
wherein the grommet includes coupling flanges respectively formed at positions of the first connecting end and the second connecting end.

5. The actuator of claim 4, wherein:
the motor includes a motor and a screw connected to the motor; and
the housing includes a motor accommodation portion configured to accommodate the motor and a screw accommodation portion configured to communicate with the motor accommodation portion and accommodate the screw.

6. The actuator of claim 5, wherein:
the screw accommodation portion includes an inlet connected to the motor accommodation portion and an outlet open to an outside; and
the cap is coupled to the outlet.

7. The actuator of claim 4, wherein the motor includes:
a stator disposed inside the motor accommodation portion and having a coil wound therearound;
a rotor disposed at an inner side of the stator;
a shaft coupled to the rotor; and
a busbar connected to the coil.

8. The actuator of claim 7, wherein the motor includes a connecting terminal configured to connect the first connecting end and the busbar.

9. The actuator of claim 4, wherein the terminal includes a body disposed along a circumference of the cap and configured to connect the first connecting end and the second connecting end.

10. The actuator of claim 4, wherein the grommet includes a terminal connecting hole formed at a position of the first connecting end.

11. The actuator of claim 8, wherein the housing includes a connecting terminal accommodation portion configured to accommodate the connecting terminal.

12. The actuator of claim 5, wherein the motor includes a worm wheel engaged with the screw.

13. The actuator of claim 5, wherein the housing includes a worm wheel accommodation portion configured to communicate with the screw accommodation portion.

14. The actuator of claim 13, wherein the second connecting end is disposed above the worm wheel accommodation portion.

* * * * *